United States Patent [19]
Fukuda

[11] Patent Number: 4,620,773
[45] Date of Patent: Nov. 4, 1986

[54] PROJECTION LENS FOR PROJECTION TELEVISION

[75] Inventor: Kyohei Fukuda, Fujisawa, Japan

[73] Assignee: Hitachi, Ltd., Tokyo, Japan

[21] Appl. No.: 494,447

[22] Filed: May 13, 1983

[30] Foreign Application Priority Data

May 15, 1982 [JP] Japan .................. 57-82278
Feb. 25, 1983 [JP] Japan .................. 58-29319

[51] Int. Cl.$^4$ .................. G02B 13/18; G02B 9/34; G02B 27/18
[52] U.S. Cl. .................. 350/432; 350/412; 350/445; 350/469
[58] Field of Search .................. 350/432, 412, 445, 469

[56] References Cited

U.S. PATENT DOCUMENTS

| | | | |
|---|---|---|---|
| 3,429,997 | 2/1969 | Rosner et al. | 350/438 X |
| 3,516,734 | 6/1970 | Schmidt | 350/412 X |
| 3,800,085 | 3/1974 | Ambats et al. | 350/420 X |
| 3,868,173 | 2/1975 | Miles et al. | 350/432 X |
| 4,232,943 | 11/1980 | Rogers | 350/445 |
| 4,300,817 | 11/1981 | Betensky | 350/432 X |
| 4,348,081 | 9/1982 | Betensky | 350/432 X |

FOREIGN PATENT DOCUMENTS 593514  10/1947  United Kingdom .................. 350/473

*Primary Examiner*—John K. Corbin
*Assistant Examiner*—Scott J. Sugarman
*Attorney, Agent, or Firm*—Antonelli, Terry & Wands

[57] ABSTRACT

A projection lens for magnifying an image displayed on a cathode-ray tube and projecting the magnified image on a projection screen comprises a first lens having a substantially plano surface opposite to the cathode-ray tube and a concave surface, a second lens which is convex meniscus lens having a concave surface opposite to the concave surface of the first lens, a third lens having a strongest positive refracting power and at one convex surface, and a fourth lens spaced apart by a predetermined distance from the third lens having at least one convex surface. The first to fourth lenses are arranged in the above order from the side of the cathode-ray tube, and the predetermined distance between the third and fourth lenses is large enough to permit interposition of a plano reflecting mirror therebetween.

4 Claims, 46 Drawing Figures

FIG.I
PRIOR ART
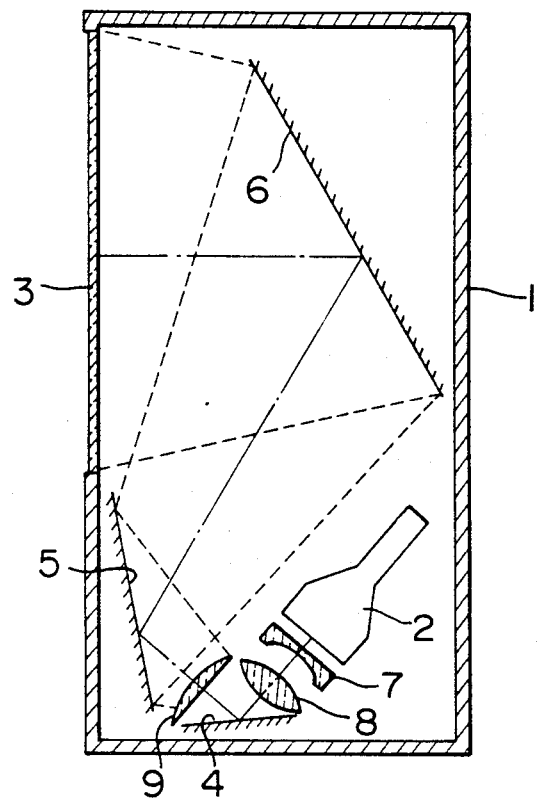
FIG.2
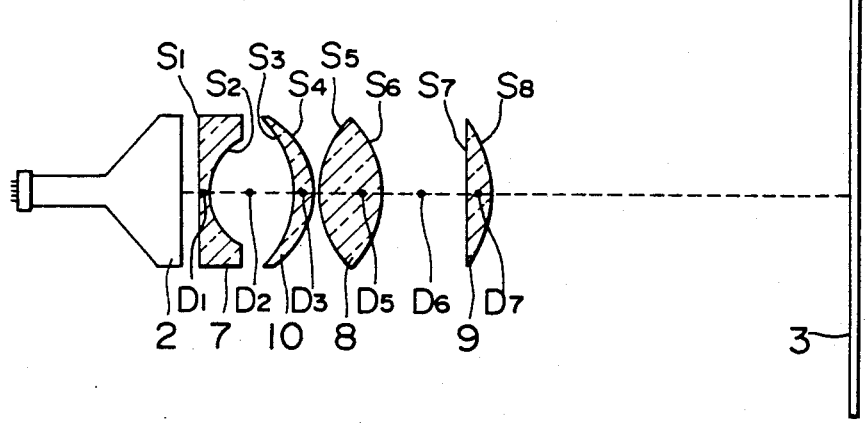

FIG. 7
(A) 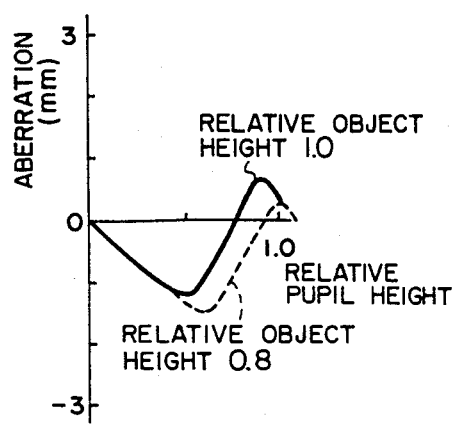
(B) 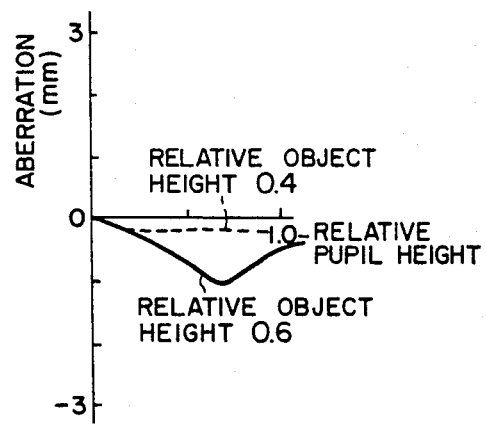
(C) 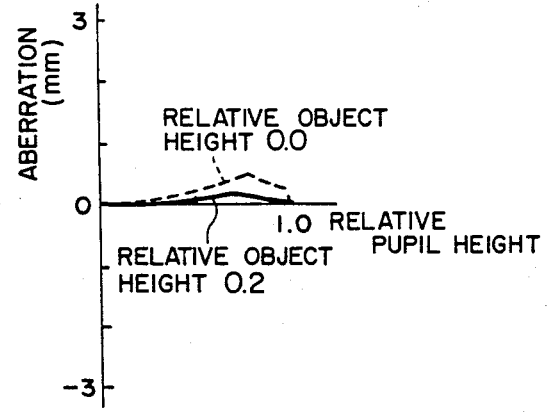

FIG. 9
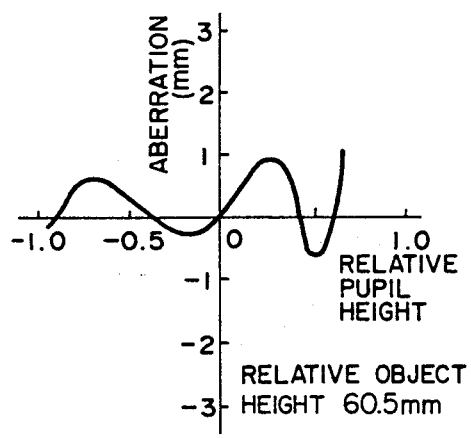
(G) RELATIVE OBJECT HEIGHT 60.5mm
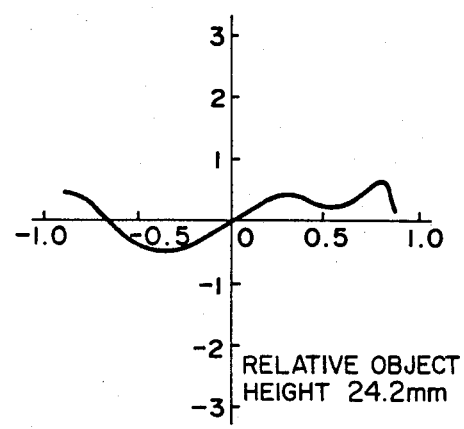
(J) RELATIVE OBJECT HEIGHT 24.2mm
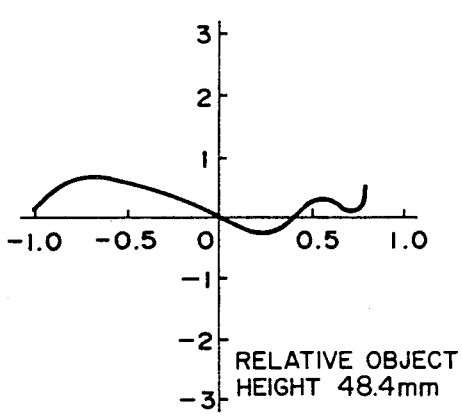
(H) RELATIVE OBJECT HEIGHT 48.4mm
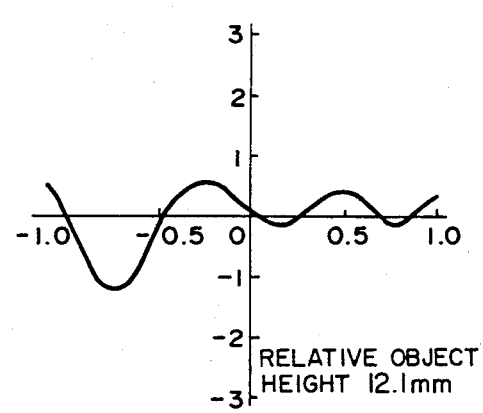
(K) RELATIVE OBJECT HEIGHT 12.1mm
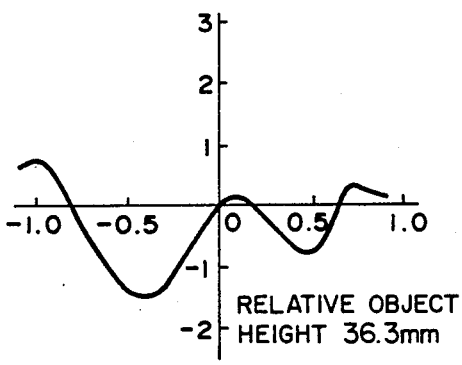
(I) RELATIVE OBJECT HEIGHT 36.3mm
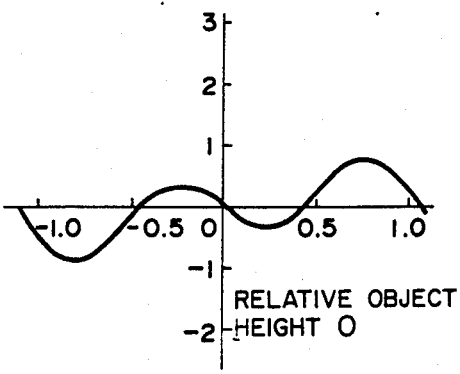
(L) RELATIVE OBJECT HEIGHT 0

FIG.11
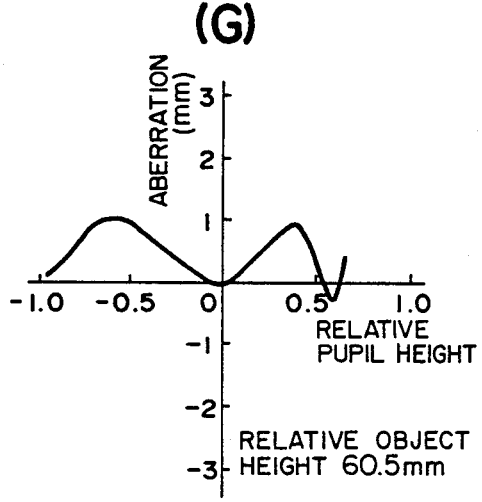
(G) RELATIVE OBJECT HEIGHT 60.5mm
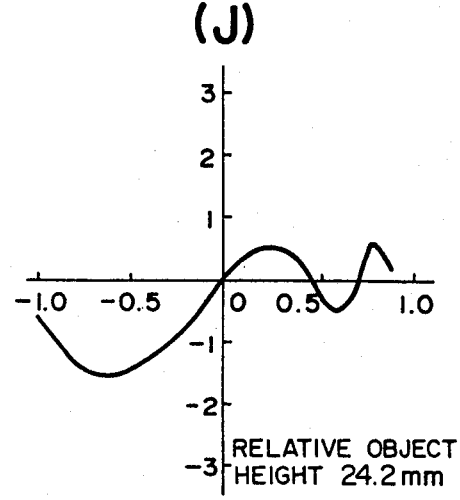
(J) RELATIVE OBJECT HEIGHT 24.2mm
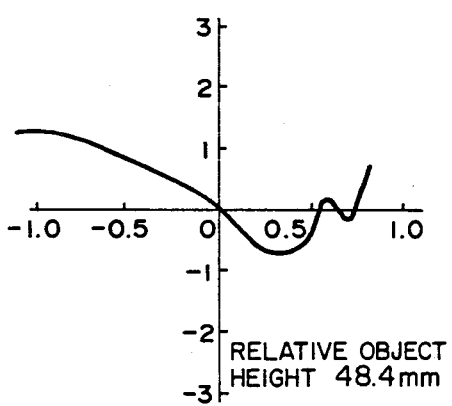
(H) RELATIVE OBJECT HEIGHT 48.4mm
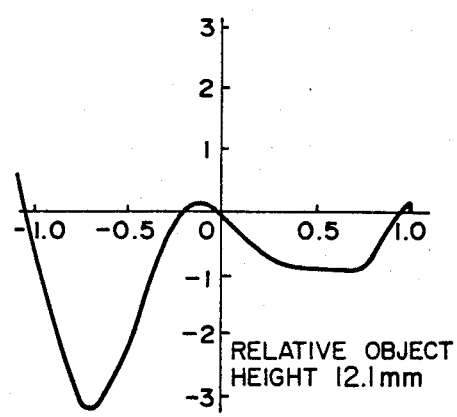
(K) RELATIVE OBJECT HEIGHT 12.1mm
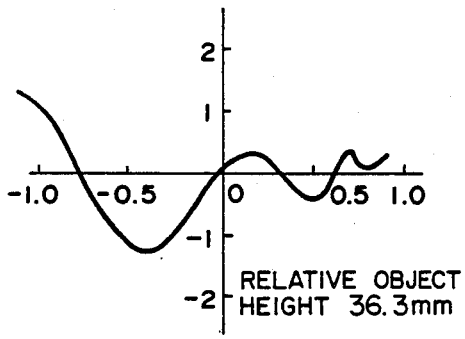
(I) RELATIVE OBJECT HEIGHT 36.3mm
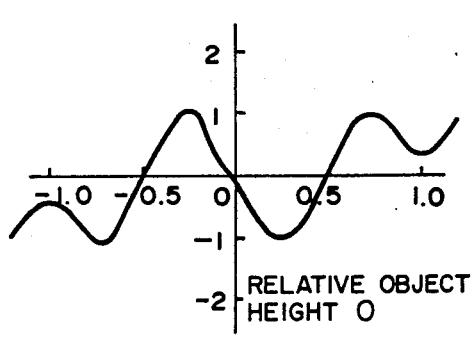
(L) RELATIVE OBJECT HEIGHT 0

PROJECTION LENS FOR PROJECTION TELEVISION

BACKGROUND OF THE INVENTION

This invention relates to a projection lens used in a so-called projection television apparatus in which an enlargement of an image appearing on a cathode-ray tube is projected on a large screen.

The factors governing the quality of an image projected on a projection screen in such a projection television apparatus include the cathode-ray tube, projection lens and screen, and the present invention contemplates to improve the image quality by improving the structure of the projection lens. It is the recent tendency to change the material of the projection lens of the kind above described from the glass to a plastic material and provide aspherical lens surfaces so as to improve the brightness and resolution even with a small number of component lenses. Such a proposal is made in, for example, U.S. Pat. No. 4,300,817. The U.S. patent discloses a projection lens of three lens structure attaining an f-number of 1.0 thereby providing a very high brightness when compared with the past one. FIG. 1 shows schematically the structure of a projection television apparatus using such a projection lens.

The projection television apparatus shown in FIG. 1 includes a projection lens of three lens structure, and the reference numeral 1 designates a casing; 2, a cathode-ray tube; 3, a projection screen; 4, 5, 6, mirrors; 7, a having a concave surface lens; and 8, 9, having convex surfaces lenses.

Referring to FIG. 1, an image appearing on the cathode-ray tube 2 disposed in the casing 1 is magnified by the projection lens composed of the lens 7 and lenses 8, 9, and the magnified image is reflected by the mirrors 5, 6 to be projected and displayed on the projection screen 3 fixed to the casing 1.

Since the projection lens is composed of the lens 7 and lenses 8 and 9, a bright magnified image can be displayed on the projection screen 3. Further, since the optical path from the cathode-ray tube 2 to the projection screen 3 is bent by the mirrors 5 and 6, and, also, since the mirror 4 interposed between the lenses 8 and 9 having convex surfaces of the projection lens acts to bend the optical path, the projection television apparatus can be made compact and small in overall size.

However, although the lenses 7, 8 and 9 composing such a projection lens are configured to have predetermined spherical and aspherical surfaces to eliminate aberrations thereby improving the resolution, the resolution of the illustrated projection lens is not still fully sufficient or satisfactory. This is because a relatively large aberration occurs in the marginal zone of the image plane.

The contrast is another important item required for the image quality in such a projection television apparatus. The contrast is affected greatly by the stray light resulting from reflection by the lens surfaces, lens barrels, etc. The prior art projection lens disclosed in the cited U.S. patent has been defective in that the contrast is greatly degraded by the reflection of light from the concave lens surfaces.

SUMMARY OF THE INVENTION

With a view to obviate the prior art defect pointed out above, it is a primary object of the present invention to provide an improved projection lens which eliminates the aberration occurring in the marginal zone of the image plane to improve the resolution so that a very bright magnified image of high resolution can be projected, and which can provide a projection television apparatus of reduced overall size.

The present invention which attains the above object is featured by the fact that a first lens having a concave surface, a second lens which is a convex meniscus lens having a concave surface opposite the concave surface of the concave lens, a third lens having a strongest refracting power and at least one convex surface, and a fourth lens having a relatively weak power and at least one convex surface are arranged in the above order from the side of a cathode-ray tube, and a space is provided between the third and fourth lenses so that a mirror for bending the optical path can be disposed in the space.

BRIEF DESCRIPTION OF THE DRAWINGS

FIG. 1 shows schematically the structure of one form of a prior art projection television apparatus.

FIG. 2 shows schematically the stucture of an embodiment of the projection lens according to the present invention.

FIGS. 6(A) to 6(C) and FIGS. 7(A) to 7(C) are graphs showing lateral aberrations in the meridional and saggital directions respectively when the projection lens shown in FIG. 2 is used to provide a magnification of 9.37.

DESCRIPTION OF THE PREFERRED EMBODIMENTS

Figure 3:
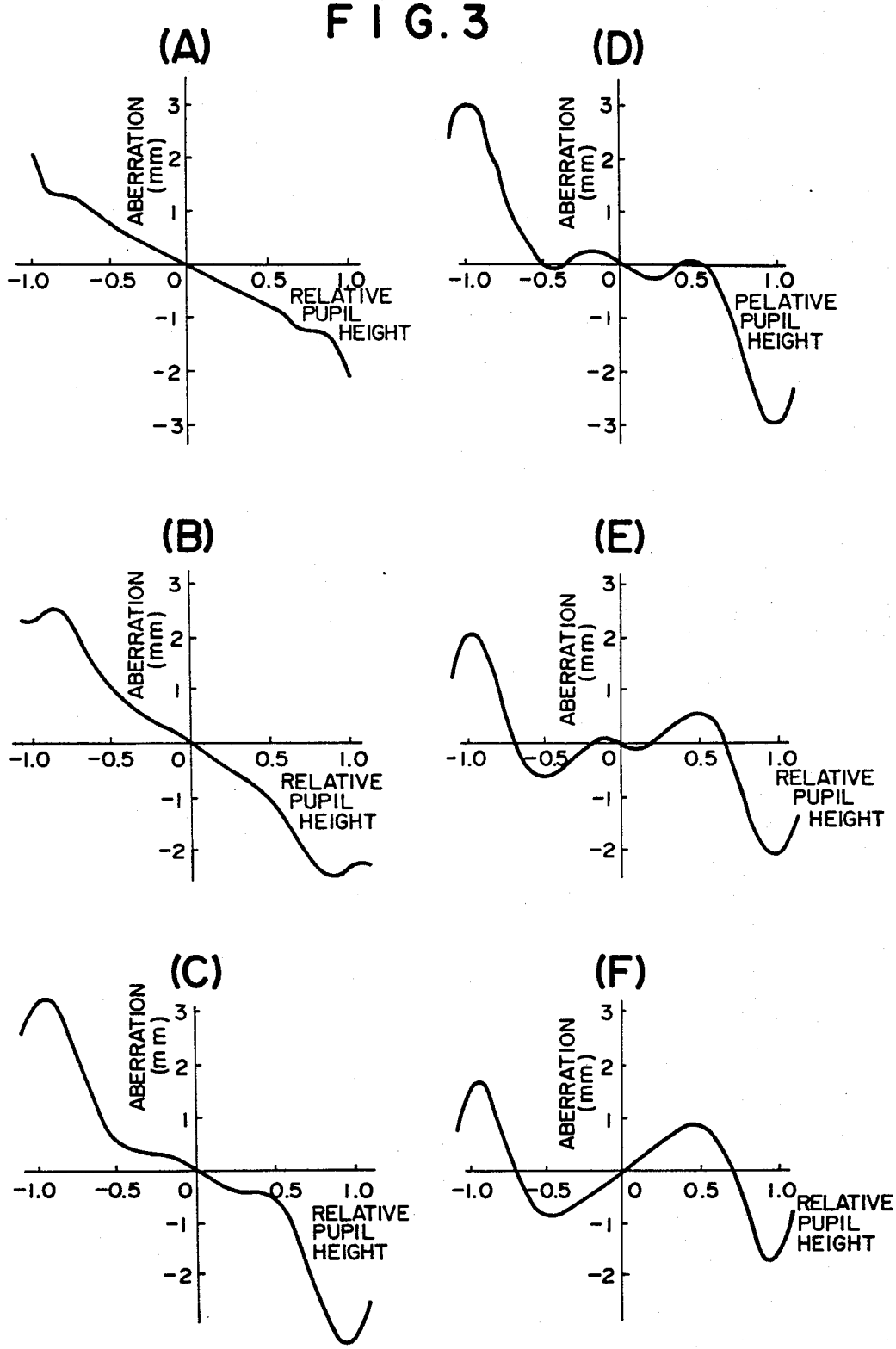
FIGS. 3(A) to 3(F) and FIGS. 4(A) to 4(E) are graphs showing lateral aberrations in the saggital and meridional directions respectively when the projection lens shown in FIG. 2 is used to provide a magnification of 8.7.

Preferred embodiments of the present invention will now be described in detail with reference to the drawings.

FIG. 2 shows schematically the structure of an embodiment of the projection lens according to the present invention. In FIG. 2, the reference numeral 10 designates a convex meniscus lens, and like reference numerals are used to designate like or equivalent parts appearing in FIG. 1.

Referring to FIG. 2, a concave lens 7 which is substantially plano at the surface opposite to a cathode-ray tube 2 and concave at the other surface, a convex meniscus lens 10 which is concave at the surface opposite to the concave lens 7 and convex at the other surface, a first convex lens 8 which is bi-convex and has a strongest positive refracting power, and a second convex lens 9 which is plano at the surface opposite to the convex lens 8 and convex at the other surface and has a relatively weak power, are arranged in the above order from the side of the cathode-ray tube 2 to compose a projection lens. All of these lenses 7 to 10 are made of an acrylic resin material and have spherical or aspherical surfaces.

The concave lens 7 acts to correct the curvature of field thereby flattening the field. The surface (which will be referred to hereinafter as a surface $S_1$) of the concave lens 7 opposite to the cathode-ray tube 2 is substantially plano, while the other surface (which will be referred to hereinafter as a surface $S_2$) is in the form of a concave aspherical surface.

The combination of the convex meniscus lens 10 and the convex lens 8 acts to correct aberrations in the marginal zone of the image plane thereby improving the resolution. The concave surface (referred to hereinafter as a surface $S_3$) of the convex meniscus lens 10 opposite to the concave lens 7 and the surface (referred to hereinafter as a surface $S_6$) of the convex lens 8 on the side of the concave surface of the lens 7 are both aspherical. On the other hand, the other convex surface (referred to hereinafter as a surface $S_4$) of the convex meniscus lens 10 and the other surface (referred to hereinafter as a surface $S_5$) of the convex lens 8 are both spherical.

The convex lens 9 acts to correct the spherical aberration. The surface (referred to hereinafter as a surface $S_7$) of the convex lens 9 opposite to the convex lens 8 is plano, while the other surface (referred to hereinafter as a surface $S_8$) is aspherical.

Table 1 shows the radius of surface curvature, clear aperture, axial distance between surfaces and index of refraction of each of the lenses composing the projection lens shown in FIG. 2, and Table 2 shows the aspherical coefficients of the lens surfaces $S_2$, $S_3$, $S_6$ and $S_8$. The f-number and focal distance of this projection lens are 0.95 and 117.4 mm respectively.

TABLE 1

| Lens | Surface | Surface radius (mm) | Clear aperture (mm) | Distance between surfaces (mm) | Refraction index |
|---|---|---|---|---|---|
| Concave lens 7 | $S_1$ | ∞ | 127.0 | $D_1 = 5.0$ | 1.4934 |
| | $S_2$ | 64.0 | 90.0 | $D_2 = 52.0$ | 1.0 |
| Convex meniscus lens 10 | $S_3$ | −100.0 | 100.0 | $D_3 = 20.0$ | 1.4934 |
| | $S_4$ | −80.8 | 120.0 | $D_4 = 1.1$ | 1.0 |
| Convex lens 8 | $S_5$ | 230.0 | 118.0 | $D_5 = 32.0$ | 1.4934 |
| | $S_6$ | −94.126 | 116.9 | $D_6 = 115.0$ | 1.0 |
| Convex lens 9 | $S_7$ | ∞ | 130.0 | $D_7 = 10.0$ | 1.4934 |
| | $S_8$ | −276.74 | 130.0 | | |

TABLE 2

| Surface | Aspherical Coefficient | | | | |
|---|---|---|---|---|---|
| | CC | AD | AE | AF | AG |
| $S_2$ | 0.4783 | $1.766 \times 10^{-7}$ | $5.0111 \times 10^{-10}$ | $3.1723 \times 10^{-13}$ | $1.1040 \times 10^{-16}$ |
| $S_3$ | 0 | $-8.6680 \times 10^{-7}$ | $7.1927 \times 10^{-10}$ | $-4.6958 \times 10^{-13}$ | $1.1984 \times 10^{-16}$ |
| $S_6$ | 0 | $-1.6040 \times 10^{-8}$ | $-2.0191 \times 10^{-11}$ | $1.3966 \times 10^{-14}$ | $-9.6989 \times 10^{-19}$ |
| $S_8$ | −5.4255 | $3.5287 \times 10^{-8}$ | $2.3657 \times 10^{-11}$ | $-4.2062 \times 10^{-15}$ | $4.0562 \times 10^{-19}$ |

The aspherical coefficients CC, AD, AE, AF and AG in Table 2 are those included in the following equation which represents the axial displacement Z at a semi-aperture distance r from the optical axis of the lens:

$$Z = \frac{C \cdot r^2}{1 + \sqrt{1 - (1 + CC)C^2 r^2}} + AD \cdot r^4 + AE \cdot r^6 + AF \cdot r^8 + AG \cdot r^{10}$$

where C is the reciprocal of the radius of curvature at the optical axis.

FIGS. 3(A) to 3(F) and FIGS. 4(A) to 4(E) are graphs showing aberrations when the projection lens shown in FIG. 2 is used to provide a magnification of 8.7. More precisely, FIGS. 3(A) to 3(F) are graphs showing lateral aberrations in the saggital direction when the object height is 63.5 mm, 50.4 mm, 38.1 mm, 25.4 mm, 12.7 mm and 0.0 mm respectively, while FIGS. 4(A) to 4(E) are graphs showing lateral aberrations in the meridional direction when the object height is 63.5 mm, 50.4 mm, 38.1 mm, 25.4 mm and 12.7 mm respectively.

Figure 4:
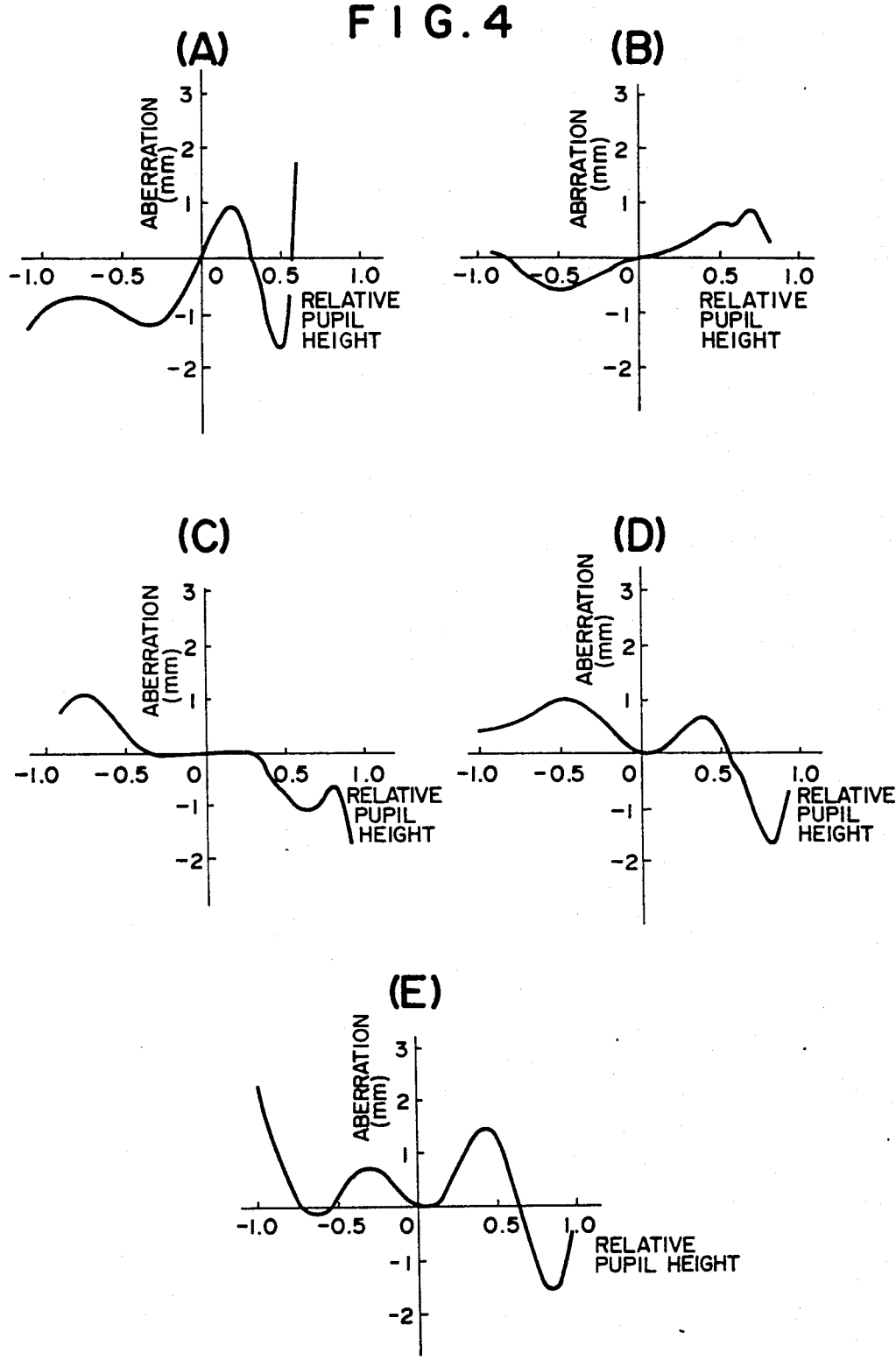

It will be apparent from FIGS. 3 and 4 that the lateral aberrations can be limited to within 3 mm, and the aberrations on the central axis are sufficiently corrected even in the marginal zones up to the f-number of 0.95. Therefore, a bright magnified image of high resolution can be displayed on the projection screen 3 shown in FIG. 2.

It will be apparent from Table 1 that the distance between the surface $S_6$ of the first convex lens 8 and the surface $S_7$ of the second convex lens 9 is 115 mm which is large enough to permit interposition of the mirror 4 between the convex lenses 8 and 9. Therefore, the optical path can be bent also by the mirror 4 so tht the overall size of the projection television apparatus can be made small. Generally, the distance TH between two lenses to permit interposition of a mirror therebetween is given by $$TH \geq \frac{D_1 + D_2}{2} \quad (1)$$

where $D_1$ and $D_2$ are the clear apertures of the opposing surfaces of these lenses respectively. When the quantity of light may be slightly sacrificed, TH may be expressed as follows:

$$TH > 0.9 \times \frac{D_1 + D_2}{2} \quad (2)$$

Figure 5:
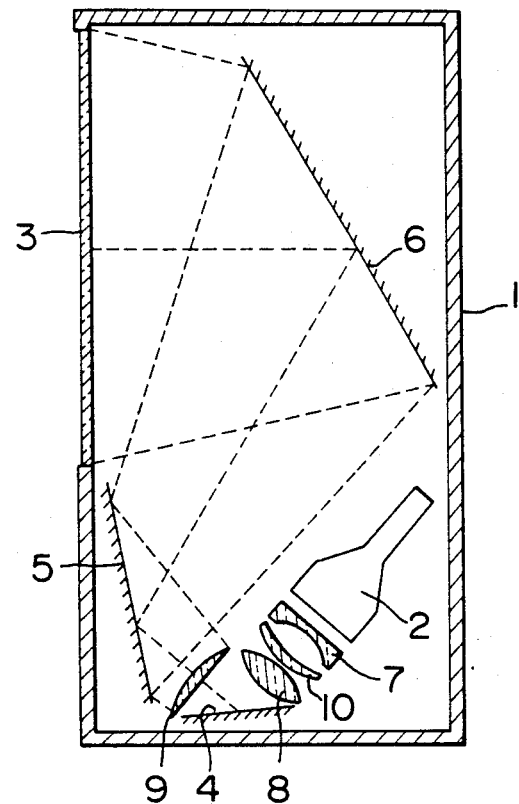
FIG. 5 shows schematically the structure of one form of a projection television apparatus which includes the projection lens shown in FIG. 2.

FIG. 5 shows schematically the structure of one form of a projection television apparatus which includes such a projection lens, and the same reference numerals are used to designate the same or equivalent parts appearing in FIGS. 1 and 2.

Referring to FIG. 5, the mirror 4 can be interposed between the convex lenses 8 and 9 and acts to bend the optical path together with the mirrors 5 and 6 so that the overall size of the projection television apparatus can be made small. Further, the marginal aberrations can be reduced by the combined action of the convex meniscus lens 10 and convex lens 8, and the aberrations can be corrected up to the f-number of 0.95 so that a bright magnified image of high resolution can be displayed on the projection screen 3.

Other examples of the radius of surface curvature, clear aperture, axial distance between surfaces and index of refraction of the individual lenses composing the projection lens shown in FIG. 2 are shown in Table 3 together with the radius of surface curvature, axial distance between surfaces and index of refraction of the phosphor screen and face plate of the cathode-ray tube 2, and Table 4 shows the aspherical coefficients of the lens surfaces $S_2$, $S_3$, $S_6$ and $S_8$. The f-number and focal distance of this projection lens is 0.95 and 117.4 mm respectively.

TABLE 3

| Lens | Surface | Surface radius (mm) | Clear aperture (mm) | Distance between surface (mm) | Refraction index |
|---|---|---|---|---|---|
| Phosphor screen | | −5000.0 | | 69.1 | 1.0 |
| Entrance pupil | | ∞ | | −69.1 | 1.0 |
| Face plate | $C_1$ | −5000.0 | | 10.0 | 1.5403 |
| | $C_2$ | ∞ | | 8.4 | 1.0 |
| Concave lens | $S_1$ | ∞ | 127.0 | 5.0 | 1.4936 |
| | $S_2$ | 64.0 | 90.0 | 51.0 | 1.0 |
| Convex meniscus lens 10 | $S_3$ | −100.0 | 100.0 | 20.0 | 1.4936 |
| | $S_4$ | −80.8 | 120.0 | 1.11 | 1.0 |
| Convex lens 8 | $S_5$ | 230.0 | 118.0 | 32.0 | 1.4936 |
| | $S_6$ | −101.1 | 116.9 | 115.0 | 1.0 |
| Convex lens 9 | $S_7$ | ∞ | 130.0 | 10.0 | 1.4936 |
| | $S_8$ | −242.7 | 130.0 | 1255.7 | 1.0 |
| Screen | $T_1$ | ∞ | 600.0 | | |

In Table 3, the values related to the lens surface $S_6$ are those measured when an aperture diaphragm is provided. Also, the symbols $C_1$ and $C_2$ designate the phosphor screen side surface and the other surface of the face plate respectively.

TABLE 4

| Surface | Aspherical Coefficient | | | | |
|---|---|---|---|---|---|
| | CC | AD | AE | AF | AG |
| $S_2$ | −0.30 | −7.57 × 10$^{-7}$ | 1.38 × 10$^{-10}$ | −1.70 × 10$^{-13}$ | 1.02 × 10$^{-16}$ |
| $S_3$ | 0 | −1.01 × 10$^{-6}$ | 8.43 × 10$^{-10}$ | −4.95 × 10$^{-13}$ | 1.17 × 10$^{-16}$ |
| $S_6$ | 0 | −1.16 × 10$^{-7}$ | 2.94 × 10$^{-11}$ | −3.76 × 10$^{-16}$ | 1.99 × 10$^{-19}$ |
| $S_8$ | −1.96 | 3.42 × 10$^{-8}$ | 2.68 × 10$^{-11}$ | −4.74 × 10$^{-15}$ | 4.01 × 10$^{-19}$ |

The individual aspherical coefficients shown in Table 4 are those included in the equation representing the displacement Z explained already with reference to Table 2.

FIGS. 6(A) to 6(C) and FIGS. 7(A) to 7(C) are graphs showing a berrations when the projection lens shown in FIG. 2 is used to provide a magnification of 9.37. More precisely, FIGS. 6(A) to 6(C) are graphs showing lateral aberrations in the meridional direction at the relative object height of various values respectively, while FIGS. 7(A) to 7(C) are graphs showing lateral aberrations in the saggital direction at the relative object height of various values respectively.

Figure 6:
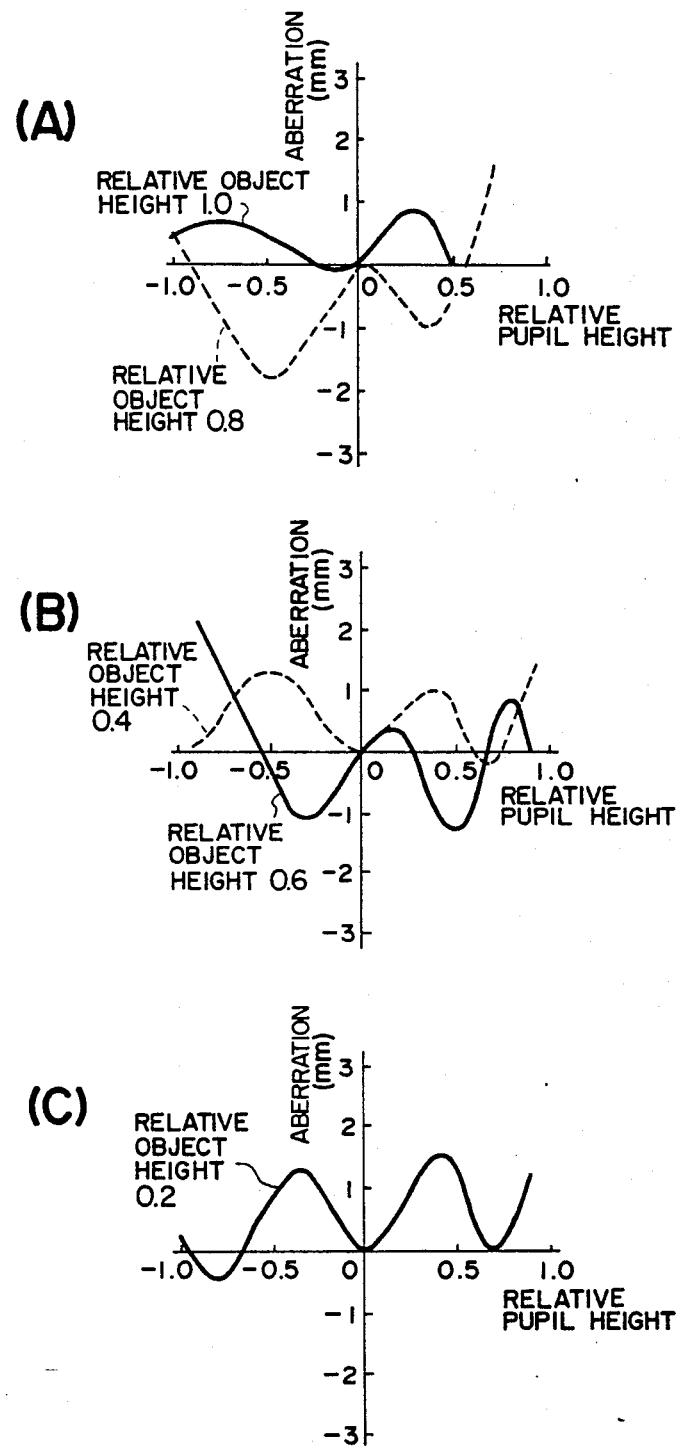

It will be apparent from FIGS. 6 and 7 that the lateral aberrations can be limited to within 2 mm, and the aberrations on the central axis are sufficiently corrected even in the marginal zones up to the f-number of 0.95. Further, as will be apparent from Table 3, the distance between the convex lenses 8 and 9 is 115 mm which is large enough to permit interposition of the mirror 4 therebetween in view of the expressions (1) and (2) described already. Since thus the optical path can be bent also by the mirror 4 so that the overall size of the projection television apparatus can be made small as shown in FIG. 5.

Another embodiment of the projection lens according to the present invention will be described with reference to FIG. 8.

Figure 8:
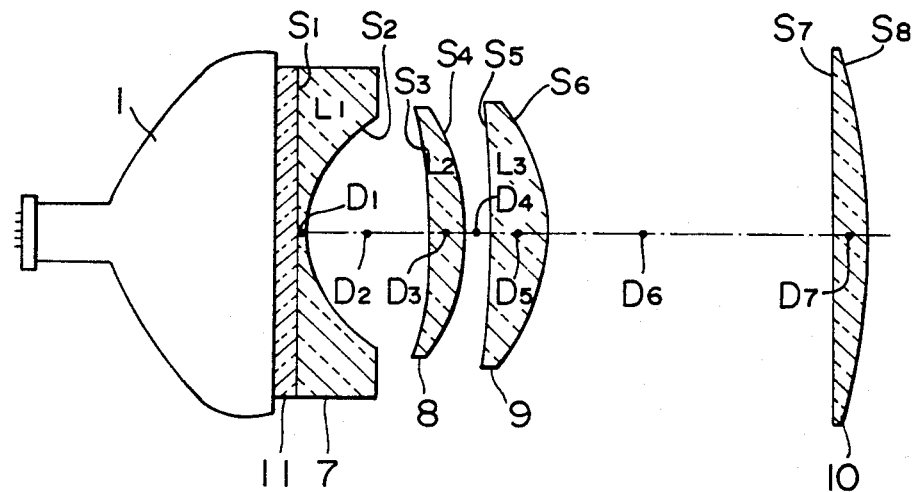
FIG. 8 shows schematically the structure of another embodiment of the projection lens according to the present invention.

The embodiment shown in FIG. 8 is featured by the fact that a concave lens $L_1$ 7 which is substantially plano at the surface $S_1$ opposite to a cathode-ray tube 1 and concave at the other surface $S_2$, a convex meniscus lens $L_2$ 8 which is concave at the surface $S_3$ opposite to the lens $L_1$ 7 and convex at the other surface $S_4$, another convex meniscus lens $L_3$ 9 which is concave at the surface $S_5$ opposite to the lens $L_2$ 8 and convex at the other surface $S_6$, and a convex lens $L_4$ 10 which is plano at the surface $S_7$ opposite to the lens $L_3$ 9 and convex at the other surface $S_8$ and has a relatively weak power, are arranged in the above order from the side of the cathode-ray tube 1 to compose a projection lens of four lens structure, and the lens $L_3$ 9 contributing most to the overall power is made of a glass material so as to minimize degradation of focussing due to the adverse effect of temperature. The embodiment shown in FIG. 8 is further featured by the fact that a transparent medium 11 having an index of refraction of 1.4 to 1.6 is filled in the space between the lens $L_1$ 7 and the cathode-ray tube 1 to minimize reflection of light from the surfaces of the cathode-ray tube 1 and lens $L_1$ 7 thereby improving the contrast.

In the embodiment shown in FIG. 8, an image scanned by the electron beams on the phosphor screen of the cathode-ray tube 1 is magnified by the first lens $L_1$ 7, second lens $L_2$ 8, third lens $L_3$ 9 and fourth lens $L_4$ 10, and the magnified image is displayed on the projection screen 3 shown in FIG. 2. The third lens $L_3$ 9 contributing most to the overall power is made of a glass material as described above, while the remaining first, second and fourth lenses are made of a plastic material such as an acrylic resin. The lens data of these lenses are shown in Tables 5 and 6.

TABLE 5 f-number = 0.9

| Lens | Surface | surface radius (mm) | Clear aperture (mm) | Distance between surface (mm) | Refraction index |
|---|---|---|---|---|---|
| $L_1$ | $S_1$ | ∞ | 130.0 | $D_1$ = 3.0 | 1.4936 |
| | $S_2$ | 74.495 | 96.0 | $D_2$ = 50.019 | |
| $L_2$ | $S_3$ | −635.924 | 92.0 | $D_3$ = 20.0 | 1.4936 |
| | $S_4$ | −95.724 | 120.0 | $D_4$ = 12.16 | |
| $L_3$ | $S_5$ | −697.941 | 118.0 | $D_5$ = 32.0 | 1.5403 |
| | $S_6$ | −92.869 | 118.0 | $D_6$ = 120.0 | |
| $L_4$ | $S_7$ | 734.887 | 146.0 | $D_7$ = 10.0 | 1.4936 |
| | $S_8$ | −364.876 | 146.0 | | |

TABLE 6

| Surface | Aspherical Coefficient | | | | |
|---|---|---|---|---|---|
| | CC | AD | AE | AF | AG |
| $S_2$ | −0.3 | 3.666E-06 | −7.146E-10 | −2.208E-13 | 1.362E-16 |
| $S_3$ | 0.0 | −1.084E-06 | 5.694E-10 | −3.706E-13 | 6.661E-17 |
| $S_4$ | 0.0 | −3.297E-07 | −5.366E-11 | −3.668E-15 | −1.278E-17 |
| $S_8$ | −13.67 | 1.208E-08 | 1.366E-11 | −2.585E-15 | 1.869E-19 |

The aspherical coefficients CC, AD, AE, AF and AG in Table 6 are those included in the following equation which represents the axial displacement Z at a semi-aperture distance r from the optical axis of the lens:

$$Z = \frac{C \cdot r^2}{1 + \sqrt{1 - (1 + CC)C^2 r^2}} + AD \cdot r^4 + AE \cdot r^6 + AF \cdot r^8 + AG \cdot r^{10}$$

where C is the reciprocal of the radius of curvature at the optical axis.

FIGS. 9(A) to 9(L) are graphs showing aberrations on the projection screen 3 when the projection lens shown in FIG. 8 is used to magnify a phosphor image of 4.8 inches on the phosphor screen of the cathode-ray tube 1 with a magnification of 9.67 to display a magnified image of 45 inches on the projection screen 3. More precisely, FIGS. 9(A) to 9(F) are graphs showing lateral aberrations in the saggital direction, in each of which the vertical axis represents the aberration and the horizontal axis represents the relative pupil height. FIGS. 9(G) to 9(L) are graphs showing lateral aberrations in the meridional direction, in each of which the vertical and horizontal axes represent the same amounts as those in FIG. 9(A) respectively. It will be apparent from these graphs that the aberrations on the central axis are sufficiently corrected even in the marginal zones up to the f-number of 0.9. Further, owing to the fact that the lens $L_3$ 9 contributing most to the overall power among the four lens groups is made of glass, the projection lens is not susceptible to the adverse effect of temperature. Actually, in the case of the projection lens of the present invention shown in FIG. 8, the rate of defocusing of a projected image due to a temperature variation can be reduced to about one-half the prior art rate. In the lens system of the present invention, the both surfaces of the lens $L_2$ are made aspherical to maintain least possible aberrations.

In the embodiment of the projection lens shown in FIG. 8, $BK_7$ is used as the material of the glass lens $L_3$. The dispersion of such a glass lens is less by 10 to 20% than that of an acrylic lens, and, therefore, the chromatic aberration can also be reduced by 10 to 20%.

Further, as shown in FIG. 8, the projection lens of the present invention is so designed that the space between the cathode-ray tube 1 and the concave lens $L_1$ 7 is filled with the transparent medium 11, such as, for example, a silicone gel having an index of refraction of 1.4 to 1.6, thereby preventing reflection at the interface. The reflectance R at the interface between a substance having an index of refraction $N_1$ and a substance having an index of refraction $N_2$ is generally given by the following equation:

$$R = \frac{(N_1 - N_2)^2}{(N_1 + N_2)^2}$$

The above equation teaches that the reflectance R decreases sharply when the difference between the refraction indices $N_1$ and $N_2$ becomes smaller. Therefore, with a lens arrangement as shown in FIG. 8, the reflectance at the interface is greatly decreased to less than 1/10 of the prior art value thereby correspondingly improving the contrast. Although there are various factors causing degradation of the contrast in a practical projection television apparatus, the projection lens according to the present invention can improve the contrast to about twice the prior art one.

Figure 10:
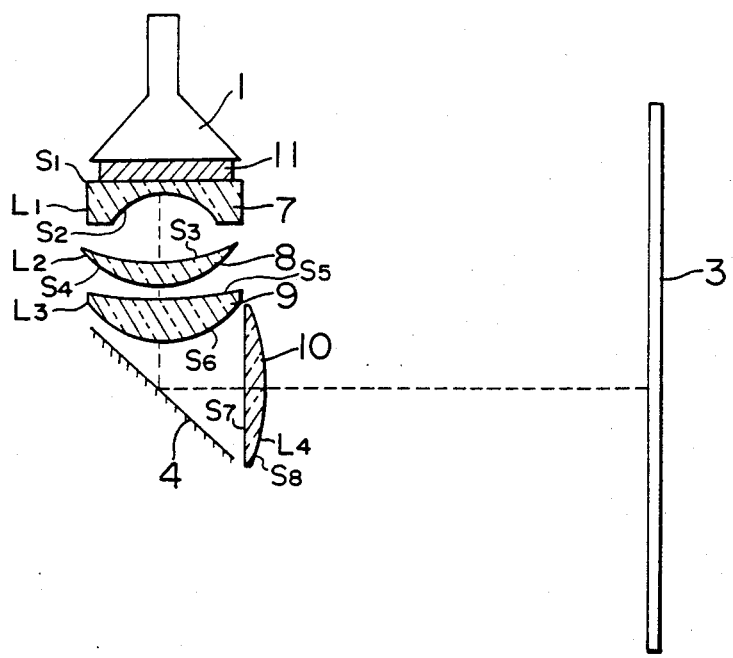
FIG. 10 shows schematically the structure of still another embodiment of the projection lens according to the present invention.
Figure 9:
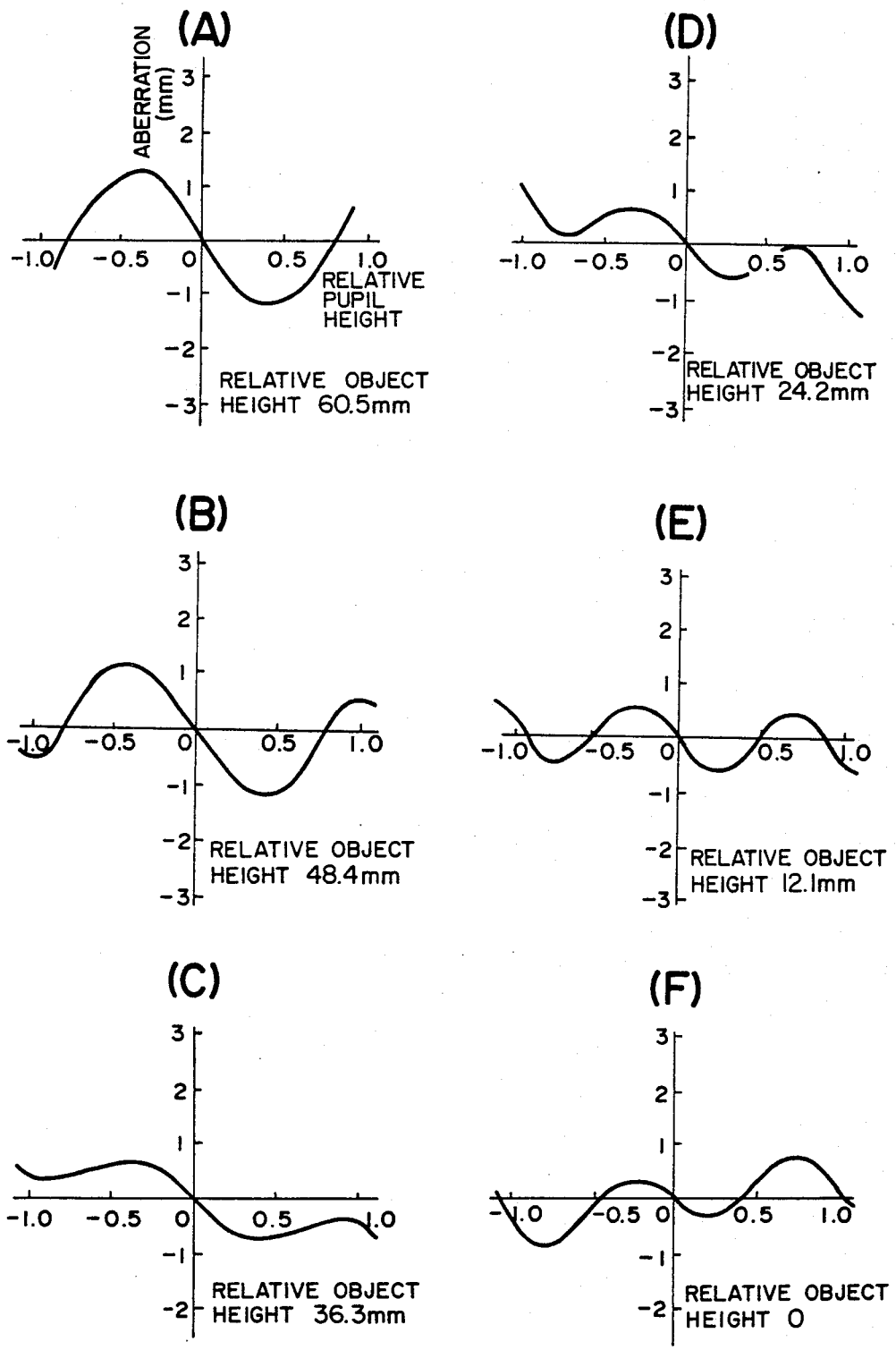
FIGS. 9(A) to 9(L) are graphs showing the aberration characteristics of the embodiment shown in FIG. 8.

FIG. 10 shows a modification of the projection lens shown in FIG. 8. Referring to FIG. 10, the distance between the lenses $L_3$ 9 and $L_4$ 10 is large enough to permit interposition of a mirror 4 therebetween. The lens arrangement shown in FIG. 10 can realize a more compact projection television apparatus.

In the projection lens of the present invention shown in FIG. 10, the fourth lens $L_4$ 10 cannot be moved simultaneously with the other lenses since the concave lens $L_1$ 7 is not movable relative to the cathode-ray tube 1 and since the mirror 4 is interposed between the third and fourth lenses $L_3$ 9 and $L_4$ 10. Therefore, practical focusing means include means for moving the second lens $L_2$ 8, means for moving the third lens $L_3$ 9, means for simultaneously moving the second and third lenses $L_2$ 8 and $L_3$ 9, and means for moving the fourth lens $L_4$ 10. For each of the above cases, the amount of lens movement required for following 75-mm movement of the projection screen 3 and the percentage of degradation of the MTF (modulation transfer function) on the screen 3 were measured. The results are shown in Table 7.

TABLE 7

| Movable lens | Focusing movement (mm) | MTF degradation (%) |
|---|---|---|
| $L_2$ | 1.01 | 18.5 |
| $L_3$ | 0.91 | 6.6 |
| $L_2, L_3$ | 0.5 | 6.4 |
| $L_4$ | Focusing impossible | — |

It can be seen from Table 7 that the means for moving the third lens $L_3$ 9 or the means for simultaneously moving the second and third lenses $L_2$ 8 and $L_3$ 9 is most preferred.

Figure 11:
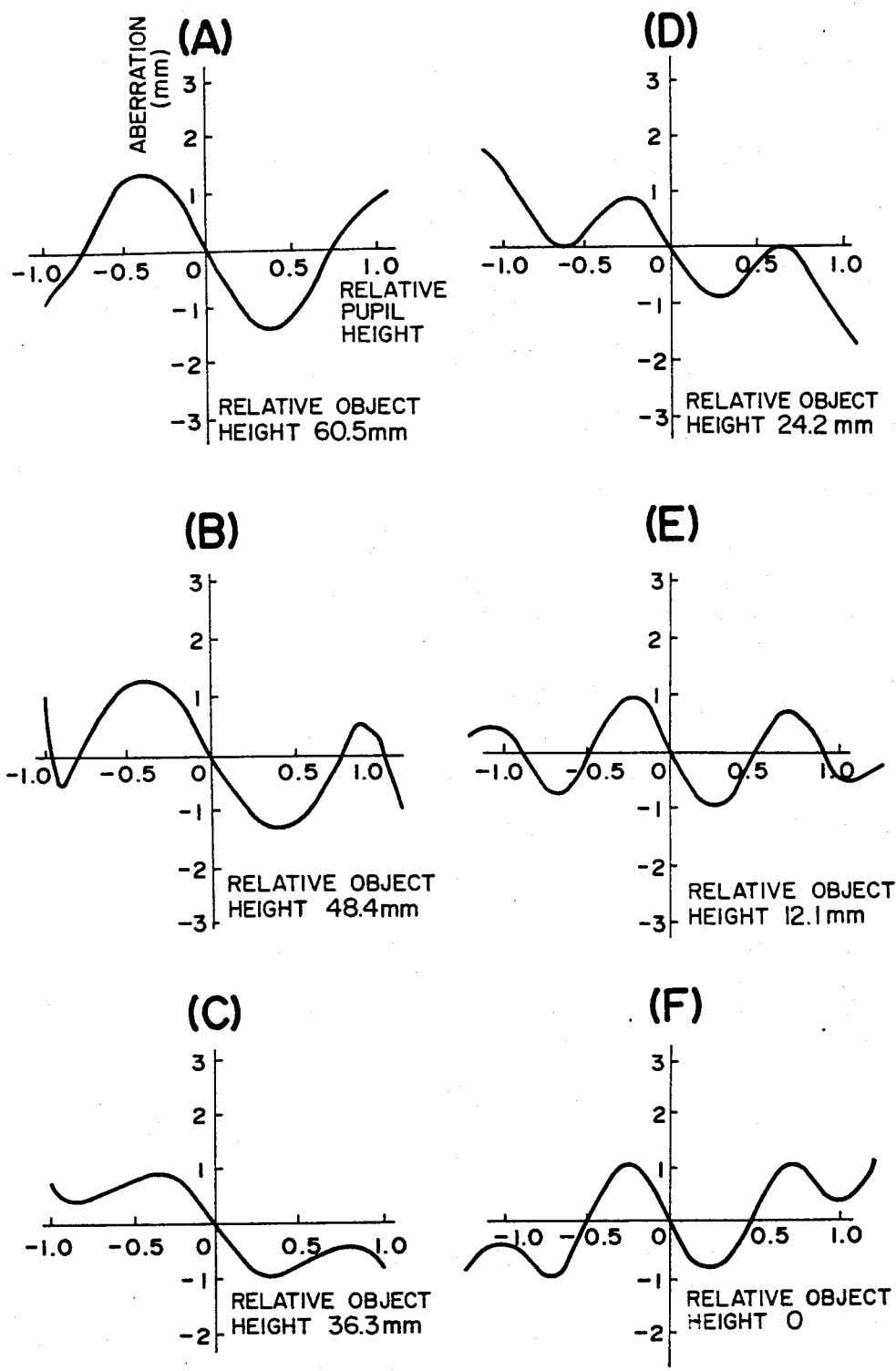
FIGS. 11(A) to 11(L) are graphs showing the aberration characteristics of the embodiment shown in FIG. 10.

Tables 8 and 9 show the lens data of the projection lens of the present invention shown in FIG. 10, and FIGS. 11(A) to 11(L) are graphs showing aberrations when the projection lens shown in FIG. 10 is used to project an image. More precisely, FIGS. 11(A) to 11(F) are graphs showing lateral aberrations in the saggital direction, while FIGS. 11(G) to 11(L) are graphs showing lateral aberrations in the meridional direction. The vertical and horizontal axes in FIG. 11 represent the same amounts as those in FIG. 9 respectively.

The total length of the projection lens shown in FIG. 10 is shorter than that shown in FIG. 8 and, also, the aperture of the glass lens shown in FIG. 10 is smaller than that shown in FIG. 8, so that the cost can be reduced, and the projection television apparatus can be made more compact.

TABLE 8

| | | f-number = 0.9 | | | |
|---|---|---|---|---|---|
| Lens | Surface | Surface radius (mm) | Clear aperture (mm) | Distance between surfaces (mm) | Refraction index |
| $L_1$ | $S_1$ | ∞ | 130.0 | $D_1$ = 5.0 | 1.4936 |
| | $S_2$ | 89.585 | 90.0 | $D_2$ = 50.0 | 1.0 |
| $L_2$ | $S_3$ | −1280.99 | 92.0 | $D_3$ = 15.0 | 1.4936 |
| | $S_4$ | −118.37 | 100.0 | $D_4$ = 1.5 | 1.0 |
| $L_3$ | $S_5$ | −887.17 | 104.0 | $D_5$ = 32.0 | 1.52 |
| | $S_6$ | −78.96 | 104.0 | $D_6$ = 120.0 | 1.0 |
| $L_4$ | $S_7$ | 380.76 | 140.0 | $D_7$ = 10.0 | 1.4936 |

TABLE 8-continued

| | | f-number = 0.9 | | |
|---|---|---|---|---|
| Lens | Surface | Surface radius (mm) | Clear aperture (mm) | Distance between surfaces (mm) | Refraction index |
| | $S_8$ | −426.37 | 140.0 | | |

TABLE 9

| Surface | Aspherical Coefficient | | | | |
|---|---|---|---|---|---|
| | CC | AD | AE | AF | AG |
| $S_2$ | −0.3 | 6.59E-06 | −1.93E-09 | −1.49E-13 | 2.10E-16 |
| $S_3$ | 0 | −1.01E-06 | 4.75E-10 | −3.81E-13 | 6.16E-17 |
| $S_4$ | 0 | −3.08E-07 | −8.65E-11 | −1.51E-14 | −1.57E-17 |
| $S_8$ | −67.23 | 4.45E-09 | 1.37E-11 | −2.04E-15 | 1.33E-19 |

As is apparent from the embodiments shown in the Tables 5 and 8, the aspheric amount of the surface $S_3$ of the second lens $L_2$ is comparatively large. With respect to the surface $S_3$, for example, in the Tables 5 and 6, the sag amount $\Delta Z$ in the maximum effective aperture against the center is −5.72 mm. On the other hand, the imagined sag amount $\Delta Z_1$, which is the sag amount in the maximum effective aperture against the center, with respect to the surface radius in the area adjacent to the center, i.e. the optical axis, is −1.67 mm. Thus the aspheric amount is very large.

The sag amount $\Delta Z$ and the imagined sag amount $\Delta Z_1$ in the embodiment of the Table 1 are as follows:

$$\Delta Z = -5.87 \text{ mm}$$

$$\Delta Z_1 = -0.82 \text{ mm}$$

The difference between the values $\Delta Z$ and $\Delta Z_1$ is −4.05 mm and −5.05 mm for the embodiments of Tables 5, 6 and 8, 9 respectively, and if it is normalized by the focal distance they become −0.035 and −0.04 respectively.

The difference, of course, becomes small as the effective aperture of a lens becomes small.

It will be understood from the foregoing detailed description that the projection lens according to the present invention provides the following advantages:

(1) In spite of a low f-number, aberrations can be satisfactorily minimized.

(2) The rate of image defocusing due to a temperature variation is reduced to about one-half the prior art rate.

(3) The contrast is improved almost twice the prior art one by virtue of the reduced number of reflective surfaces.

(4) The chromatic aberration is reduced by 10 to 20% compared with the prior art lens.

(5) Focusing by moving the third lens $L_3$ or simultaneously moving the second and third lenses $L_2$ and $L_3$ in FIG. 8 or 10 minimizes undesirable degradation of the MTF due to focusing movement.

(6) A mirror can be interposed between the third lens $L_3$ and the fourth lens $L_4$, so that a compact projection television apparatus can be realized.

I claim:

1. A projection lens for magnifying an image displayed on a cathode-ray tube and projecting the magnified image on a projection screen, comprising a first lens having a substantially plano surface opposite to said cathode-ray tube and a concave surface, a second lens which is a convex meniscus lens having a concave surface opposite to said concave surface of said first lens, a third convex lens having a strongest refracting power, and a fourth convex lens having a weak refractive power which is spaced apart by a predetermined distance from said third lens, said first to fourth lenses being arranged in the above order, said predetermined distance between said third and fourth lenses being large enough to permit interposition of a plano reflecting mirror therebetween;

wherein the radius of surface curvature, clear aperture, axial distance between surfaces, index of refraction and aspherical coefficient have the values shown in the following tables respectively, and the f-number is 0.95:

| Lens | Surface | Surface radius (mm) | Clear aperture (mm) | Distance between surfaces (mm) | Refraction index |
|---|---|---|---|---|---|
| First lens | $S_1$ | ∞ | 127.0 | 5.0 | 1.4936 |
| | $S_2$ | 64.0 | 90.0 | 51.0 | 1.0 |
| Second lens | $S_3$ | −100.0 | 100.0 | 20.0 | 1.4936 |
| | $S_4$ | −80.8 | 120.0 | 1.11 | 1.0 |
| Third lens | $S_5$ | 230.0 | 118.0 | 32.0 | 1.4936 |
| | $S_6$ | −101.1 | 116.9 | 115.0 | 1.0 |
| Fourth lens | $S_7$ | ∞ | 130.0 | 10.0 | 1.4936 |
| | $S_8$ | −242.7 | 130.0 | | | where $S_1$, $S_3$, $S_5$, and $S_7$ indicate the surfaces of the respective lenses on the side of said cathode-ray tube, and $S_2$, $S_4$, $S_6$ and $S_8$ indicate the other surfaces of the respective lenses;

| Surface | Aspherical Coefficient | | | | |
|---|---|---|---|---|---|
| | CC | AD | AE | AF | AG |
| $S_2$ | −0.30 | $7.57 \times 10^{-7}$ | $1.38 \times 10^{-10}$ | $-1.70 \times 10^{-13}$ | $1.02 \times 10^{-16}$ |
| $S_3$ | 0 | $-1.01 \times 1^{-6}$ | $8.43 \times 10^{-10}$ | $-4.95 \times 10^{-13}$ | $1.17 \times 10^{-16}$ |
| $S_6$ | 0 | $-1.16 \times 10^{-7}$ | $2.94 \times 10^{-11}$ | $-3.76 \times 10^{-16}$ | $1.99 \times 10^{-19}$ |
| $S_8$ | −1.96 | $3.42 \times 10^{-8}$ | $2.68 \times 10^{-11}$ | $-4.74 \times 10^{-15}$ | $4.01 \times 10^{-19}$ | wherein the aspherical coefficients CC, AD, AE, AF and AG are those included in the following equation which represents the axial displacement Z at a semi-aperture distance r from the optical axis of the lens:

$$Z = \frac{C \cdot r^2}{1 + \sqrt{1 - (1 + CC)C^2 r^2}} + AD \cdot r^4 + AE \cdot r^6 + AF \cdot r^8 + AG \cdot r^{10}$$

where C is the reciprocal of the radius of curvature at the optical axis.

2. A projection lens for magnifying an image displayed of a cathode-ray tube and projecting the magnified image on a projection screen, comprising a first lens having a substantially plano surface opposite to said cathode-ray tube and a concave surface, a second lens which is a convex meniscus lens having a concave surface opposite to said concave surface of said first lens, a third convex lens having a strongest positive refracting power, and a fourth convex lens having a weak refractive index which is spaced apart by a predetermined distance from said third lens, said first to fourth lenses being arranged in the above order, said predetermined distance between said third and fourth lenses being large enough to permit interposition of a plano reflecting mirror therebetween;

wherein the radius of surface curvature, clear aperture, axial distance between surfaces, index of refraction and aspherical coefficient have the values shown in the following tables respectively, and the f-number is 0.95:

| Lens | Surface | Surface radius (mm) | Clear aperture (mm) | Distance between surfaces (mm) | Refraction index |
|---|---|---|---|---|---|
| First lens | $S_1$ | ∞ | 127.0 | 5.0 | 1.4936 |
|  | $S_2$ | 64.0 | 90.0 | 51.0 | 1.0 |
| Second lens | $S_3$ | −100.0 | 100.0 | 20.0 | 1.4936 |
|  | $S_4$ | −80.8 | 120.0 | 1.11 | 1.0 |
| Third lens | $S_5$ | 230.0 | 118.0 | 32.0 | 1.4936 |
|  | $S_6$ | −101.1 | 116.9 | 115.0 | 1.0 |
| Fourth lens | $S_7$ | ∞ | 130.0 | 10.0 | 1.4936 |
|  | $S_8$ | −242.7 | 130.0 |  |  | where $S_1$, $S_3$, $S_5$ and $S_7$ indicate the surfaces of the respective lenses on the side of said cathode-ray tube, and $S_2$, $S_4$, $S_6$ and $S_8$ indicate the other surfaces of the respective lenses, and in the table, the values related to the lens surface $S_6$ are those measured when an aperture diaphragm is provided;

| Surface | CC | AD | AE | AF | AG |
|---|---|---|---|---|---|
| $S_2$ | −0.30 | $7.57 \times 10^{-7}$ | $1.38 \times 10^{-10}$ | $-1.70 \times 10^{-13}$ | $1.02 \times 10^{-16}$ |
| $S_3$ | 0 | $-1.01 \times 1^{-6}$ | $8.43 \times 10^{-10}$ | $-4.95 \times 10^{-13}$ | $1.17 \times 10^{-16}$ |
| $S_6$ | 0 | $-1.16 \times 10^{-7}$ | $2.94 \times 10^{-11}$ | $-3.76 \times 10^{-16}$ | $1.99 \times 10^{-19}$ |
| $S_8$ | −1.96 | $3.42 \times 10^{-8}$ | $2.68 \times 10^{-11}$ | $-4.74 \times 10^{-15}$ | $4.01 \times 10^{-19}$ | wherein the aspherical coefficients CC, AD, AE, AF and AG are those included in the following equation which represents the axial displacement Z at a semi-aperture distance r from the optical axis of the lens:

$$Z = \frac{C \cdot r^2}{1 + \sqrt{1 - (1 + CC)C^2 r^2}} + AD \cdot r^4 + AE \cdot r^6 + AF \cdot r^8 + AG \cdot r^{10}$$

Where C is the reciprocal of the radius of curvature at the optical axis.

3. A projection lens for magnifying an image displaced on a cathode-ray tube and projecting the magnified image on a projection screen, comprising a first lens having a substantially plano surface opposite to said cathode-ray tube and a concave surface, a second lens which is a convex meniscus lens having a concave surface opposite to said concave surface of said first lens, a third convex lens having a strongest refracting power, and a fourth convex lens having a weak refractive power which is spaced apart by a predetermined distance from said third lens, said first to fourth lenses being arranged in the above order, said predetermined distance between said third and fourth lenses being large enough to permit interposition of a plano reflecting mirror therebetween;

wherein said third lens is made of a glass material, and said first lens, said second lens and said fourth lens are made of a synthetic resin material;

wherein the lens data have the values shown in the following tables respectively, and the f-number is 0.9:

| Lens | Surface | Surface radius (mm) | Clear aperture (mm) | Distance between surfaces (mm) | Refraction index |
|---|---|---|---|---|---|
| First lens | $S_1$ | ∞ | 127.0 | 5.0 | 1.4936 |
|  | $S_2$ | 64.0 | 90.0 | 51.0 | 1.0 |
| Second lens | $S_3$ | −100.0 | 100.0 | 20.0 | 1.4936 |
|  | $S_4$ | −80.8 | 120.0 | 1.11 | 1.0 |
| Third lens | $S_5$ | 230.0 | 118.0 | 32.0 | 1.4936 |
|  | $S_6$ | −101.1 | 116.9 | 115.0 | 1.0 |
| Fourth lens | $S_7$ | ∞ | 130.0 | 10.0 | 1.4936 |
|  | $S_8$ | −242.7 | 130.0 |  |  | where $S_1$, $S_3$, $S_5$ and $S_7$ indicate the surfaces of the respective lenses on the side of said cathode-ray tube, and $S_2$, $S_4$, $S_6$ and $S_8$ indicate the other surfaces of the respective lenses;

| Surface | CC | AD | AE | AF | AG |
|---|---|---|---|---|---|
| $S_2$ | −0.30 | $7.57 \times 10^{-7}$ | $1.38 \times 10^{-10}$ | $-1.70 \times 10^{-13}$ | $1.02 \times 10^{-16}$ |
| $S_3$ | 0 | $-1.01 \times 1^{-6}$ | $8.43 \times 10^{-10}$ | $-4.95 \times 10^{-13}$ | $1.17 \times 10^{-16}$ |
| $S_6$ | 0 | $-1.16 \times 10^{-7}$ | $2.94 \times 10^{-11}$ | $-3.76 \times 10^{-16}$ | $1.99 \times 10^{-19}$ |
| $S_8$ | −1.96 | $3.42 \times 10^{-8}$ | $2.68 \times 10^{-11}$ | $-4.74 \times 10^{-15}$ | $4.01 \times 10^{-19}$ | wherein the aspherical coefficients CC, AD, AE, AF and AG are those included in the following equation which represents the axial displacement Z at the semi-aperture distance r from the optical axis of the lens:

$$Z = \frac{C \cdot r^2}{1 + \sqrt{1 - (1 + CC)C^2 r^2}} + AD \cdot r^4 + AE \cdot r^6 + AF \cdot r^8 + AG \cdot r^{10}$$

where C is the reciprocal of the radius of curvature at the optical axis.

4. A projection lens for magnifying an image displayed on a cathode-ray tube and projecting the magnified image on a projection screen, comprising a first lens having a substantially plano surface opposite to said cathode-ray tube and a concave surface, a second lens which is a convex meniscus lens having a concave surface opposite to said concave surface of said first lens, a third convex lens having a strongest positive refracting power, and a fourth convex lens having a weak refractive power which is spaced apart by a predetermined distance from said third lens, said first to fourth lenses being arranged in the above order, said predetermined distance between said third and fourth lenses being large enough to permit interposition of a plano reflecting mirror therebetween;

wherein said third lens is made of a glass material, and said first lens, said second lens and said fourth lens are made of a synthetic resin material;

wherein the lens data have the values shown in the following tables respectively, and the f-number is 0.9:

| Lens | Surface | Surface radius (mm) | Clear aperture (mm) | Distance between surfaces (mm) | Refraction index |
|---|---|---|---|---|---|
| First lens | $S_1$ | ∞ | 127.0 | 5.0 | 1.4936 |
|  | $S_2$ | 64.0 | 90.0 | 51.0 | 1.0 |
| Second lens | $S_3$ | −100.0 | 100.0 | 20.0 | 1.4936 |
|  | $S_4$ | −80.8 | 120.0 | 1.11 | 1.0 |
| Third lens | $S_5$ | 230.0 | 118.0 | 32.0 | 1.4936 |
|  | $S_6$ | −101.1 | 116.9 | 115.0 | 1.0 |
| Fourth lens | $S_7$ | ∞ | 130.0 | 10.0 | 1.4936 |
|  | $S_8$ | −242.7 | 130.0 |  |  | where $S_1$, $S_3$, $S_5$ and $S_7$ indicate the surfaces of the respective lenses on the side of said cathode-ray tube, and $S_2$, $S_4$, $S_6$ and $S_8$ indicate the other surfaces of the respective lenses;

| Surface | Aspherical Coefficient | | | | |
|---|---|---|---|---|---|
|  | CC | AD | AE | AF | AG |
| $S_2$ | −0.30 | $7.57 \times 10^{-7}$ | $1.38 \times 10^{-10}$ | $-1.70 \times 10^{-13}$ | $1.02 \times 10^{-16}$ |
| $S_3$ | 0 | $-1.01 \times 1^{-6}$ | $8.43 \times 10^{-10}$ | $-4.95 \times 10^{-13}$ | $1.17 \times 10^{-16}$ |
| $S_6$ | 0 | $-1.16 \times 10^{-7}$ | $2.94 \times 10^{-11}$ | $-3.76 \times 10^{-16}$ | $1.99 \times 10^{-19}$ |
| $S_8$ | −1.96 | $3.42 \times 10^{-8}$ | $2.68 \times 10^{-11}$ | $-4.74 \times 10^{-15}$ | $4.01 \times 10^{-19}$ | wherein thee aspherical coefficients CC, AD, AE, AF and AG are those included in the following equation which represents the axial displacement Z at a semi-aperture distance r from the optical axis of the lens:

$$Z = \frac{C \cdot r^2}{1 + \sqrt{1 - (1 + CC)C^2 r^2}} + AD \cdot r^4 + AE \cdot r^6 + AF \cdot r^8 + AG \cdot r^{10}$$

where C is the reciprocal of the radius of curvature at the optical axis.

* * * * *